United States Patent
Li

(10) Patent No.: US 8,164,309 B2
(45) Date of Patent: Apr. 24, 2012

(54) BATTERY CHARGING SYSTEM WITH TRICKLE CHARGING/DISCHARGING CONTROL

(75) Inventor: Guoxing Li, Sunnyvale, CA (US)

(73) Assignee: O2Micro, Inc, Santa Clara, CA (US)

( * ) Notice: Subject to any disclaimer, the term of this patent is extended or adjusted under 35 U.S.C. 154(b) by 405 days.

(21) Appl. No.: 12/512,317

(22) Filed: Jul. 30, 2009

(65) Prior Publication Data

US 2010/0033129 A1 Feb. 11, 2010

Related U.S. Application Data

(60) Provisional application No. 61/188,445, filed on Aug. 8, 2008.

(51) Int. Cl.
*H02J 7/04* (2006.01)
*H02J 7/00* (2006.01)

(52) U.S. Cl. ......... 320/149; 320/116; 320/128; 320/134
(58) Field of Classification Search ................... 320/149, 320/134, 159
See application file for complete search history.

(56) References Cited

U.S. PATENT DOCUMENTS

| 6,094,034 A * | 7/2000 | Matsuura ....................... 320/134 |
| 6,300,750 B1 * | 10/2001 | Oglesbee et al. .............. 323/282 |
| 7,423,410 B2 * | 9/2008 | Yoshio .......................... 320/134 |
| 2005/0212489 A1 | 9/2005 | Denning et al. |
| 2008/0012532 A1 * | 1/2008 | Denning ....................... 320/134 |
| 2008/0191557 A1 * | 8/2008 | Maireanu et al. ............... 307/66 |

* cited by examiner

*Primary Examiner* — M'Baye Diao

(57) ABSTRACT

A circuit for charging and/or discharging a battery includes a switch coupled to a battery in series, and a driving transistor coupled to the switch and operable for sensing a voltage of the battery. The driving transistor is turned on if the voltage of the battery is less than a predetermined threshold. A driving current flowing through the driving transistor determines an on-resistance of the switch.

20 Claims, 7 Drawing Sheets

BATTERY CHARGING SYSTEM WITH TRICKLE CHARGING/DISCHARGING CONTROL

RELATED APPLICATION

This application claims priority to U.S. Provisional Application No. 61/188,445, entitled Battery Charging System with Precharging Current Control, filed on Aug. 8, 2008, which is hereby incorporated by reference in its entirety.

BACKGROUND

Generally, trickle charging of an over-drained battery pack, e.g., a LiIon-type battery pack, can be used to avoid damaging the battery pack and to increase the battery life. FIG. 1 shows a conventional battery charging system 100 for controlling trickle charging of an over-drained battery pack.

In FIG. 1, the conventional battery charging system 100 can control trickle charging of an over-drained battery pack 114 via a charging switch 104, e.g., a charging field-effect transistor (FET), coupled to a current limiting resistor 102 in series. The charging FET 104 is coupled to a trickle charging control pin PCHG of a controller 116. A charging switch 106, e.g., a charging FET, coupled to a normal charging control pin CHG of the controller 116 is used to charge the battery pack 114 in a normal condition. A discharging switch 110, e.g., a discharging FET, coupled to a discharging control pin DSG of the controller 116 is used to discharge the battery pack 114. One of the drawbacks of the battery charging system 100 is that an extra charging switch, e.g., the charging FET 104, and an extra trickle charging control pin, e.g., the trickle charging control pin PCHG, are needed. As a result, the cost of the battery charging system 100 and the pin count of the controller 116 can be increased. Furthermore, if the controller 116 is powered by the battery pack 114, the controller 116 may not be operable when a voltage of the battery pack 114 is close to zero. Thus, it may be difficult to turn on the charging FET 104 when the voltage of the battery pack 114 is close to zero.

SUMMARY

In one embodiment, a circuit for charging and/or discharging a battery includes a switch coupled to a battery in series, and a driving transistor coupled to the switch and operable for sensing a voltage of the battery. The driving transistor is turned on if the voltage of the battery is less than a predetermined threshold. A driving current flowing through the driving transistor determines an on-resistance of the switch.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments in accordance with the present invention provide charging circuits for controlling trickle charging (e.g., pre-charging or wake-up charging) and normal charging of a battery. As used herein, "trickle charging" means to charge a battery with a relatively small charging current, e.g., during the beginning of battery charging or near the end of battery charging. Advantageously, the charging circuit includes a trickle charging driving circuit and a normal charging driving circuit coupled to one charging switch via one control pin. The trickle charging driving circuit and the normal charging driving circuit generate a trickle charging driving current and a normal charging driving current to the charging switch respectively. As such, an extra charging switch, e.g., the trickle charging FET 104 in FIG. 1, and an extra charging control pin, e.g., the trickle charging control pin PCHG in FIG. 1, can be eliminated. Although the present invention is described under the context of trickle charging, the invention is not so limited. Similarly, the present invention can be used in discharging circuits for controlling trickle discharging and normal discharging of the battery.

Figure 2:
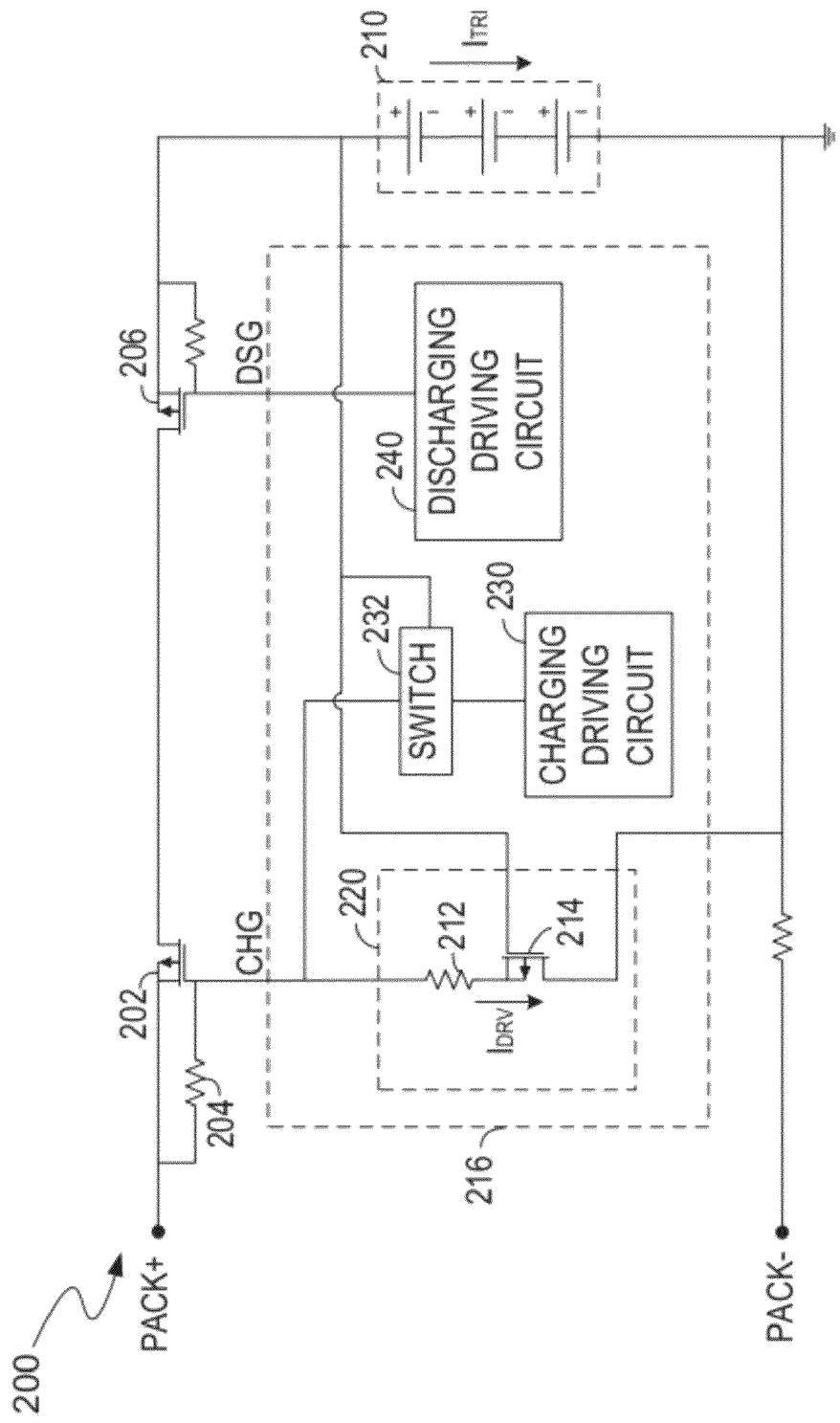
FIG. 2 is a block diagram example of a battery charging system for controlling trickle charging of a battery pack, in accordance with one embodiment of the present invention.

FIG. 2 is a block diagram example of a battery charging system 200 for controlling trickle charging of a battery pack, e.g., a battery pack 210, in accordance with one embodiment of the present invention. By way of example, a controller 216 can control trickle charging, normal charging, and discharging of the battery pack 210. The controller 216 controls the trickle charging and normal charging of the battery pack 210 via a charging switch 202, e.g., a charging FET, and controls the discharging of the battery pack 210 via a discharging switch 206, e.g., a charging FET.

In one embodiment, a normal charging driving circuit 230 and a discharging driving circuit 240 in the controller 216 are coupled to the charging switch 202 and the discharging switch 206 via a charging control pin CHG and a discharging control pin DSG respectively. The normal charging driving circuit 230 drives the charging switch 202 to control normal charging of the battery pack 210 (a normal charging mode).

The discharging driving circuit 240 drives the discharging switch 206 to control discharging of the battery pack 210.

In one embodiment, to reduce system cost and pin count, a trickle charging driving circuit 220 in the controller 216 is also coupled to the charging switch 202 via the charging control pin CHG. As such, the charging switch 202 can be controlled to conduct a trickle charging current and a normal charging current to the battery pack 210. The trickle charging current is less than the normal charging current. By way of example, the trickle charging current can be applied to the battery pack 210 during the beginning of the battery charging and/or near the end of the battery charging. A resistor 204, e.g., a pull-up resistor, is connected with the charging switch 202 in parallel. In the trickle charging driving circuit 220, a resistor 212 and a driving transistor 214, e.g., a P-channel Metal Oxide Semiconductor Field Effect Transistor (PMOS transistor), are coupled in series. The resistor 212 is connected to a gate terminal of the charging switch 202. A drain terminal of the PMOS transistor 214 is connected to ground. A gate terminal of the PMOS transistor 214 is connected to a positive terminal of the battery pack 210.

In one embodiment, the normal charging driving circuit 230 and the trickle charging driving circuit 220 in the controller 216 can function independently with each other and can both generate an output to control the charging switch 202 via the same charging control pin CHG.

When a charger is plugged between terminals PACK+ and PACK−, if a voltage of the battery pack 210 is less than a predetermined threshold $V_{THS}$, a source-gate voltage of the PMOS transistor 214 can be greater than a source-gate threshold voltage of the PMOS transistor 214. Thus, a trickle charging mode is enabled. In the trickle charging mode, the PMOS transistor 214 can be turned on to enable a current flowing from the terminal PACK+ to the terminal PACK− through the pull-up resistor 204, the resistor 212, and the PMOS transistor 214. Meanwhile, a control switch 232 in the controller 216 can turn off the normal charging driving circuit 230 to disable the normal charging mode.

In one embodiment, a source-gate voltage $V_{SG}$ of the charging switch 202 can be given by:

$$V_{SG} = R_{204} \times I_{DRV}. \quad (1)$$

$R_{204}$ represents resistance of the pull-up resistor 204. $I_{DRV}$ represents a driving current flowing through the pull-up resistor 204, the resistor 212, and the PMOS transistor 214 if a gate current of the charging switch 202 can be ignored.

During trickle charging, a negative feedback loop formed by the pull-up resistor 204, the resistor 212 and the PMOS transistor 214 can self-adjust the driving current $I_{DRV}$ and keep the driving current $I_{DRV}$ within a certain range. Resistance of the pull-up resistor 204 and the resistor 212 can be properly chosen to limit the driving current $I_{DRV}$ less than a predetermined value $I_{PRE}$. Thus, a source-gate voltage $V_{SG}$ of the charging switch 202 can be limited less than a fully turn-on voltage of the charging switch 202. As such, the charging switch 202 can be driven in an active mode. Therefore, a trickle charging current $I_{TRI}$ can be conducted from the charging switch 202 to the battery pack 210. In other words, a desirable level of the trickle charging current $I_{TRI}$ can be obtained by properly choosing the resistance of the pull-up resistor 204 and the resistor 212.

If the driving current $I_{DRV}$ increases, a voltage across the resistor 204 and the resistor 212 can be increased. Hence, a source voltage of the PMOS transistor 214 can be decreased and the source-gate voltage $V_{SG}$ of the PMOS transistor 214 can be decreased accordingly. As such, the driving current $I_{DRV}$ flowing through the PMOS transistor 214 can be decreased. If the driving current $I_{DRV}$ decreases, the voltage across the resistor 204 and the resistor 212 can be decreased. Hence, the source-gate voltage $V_{SG}$ of the PMOS transistor 214 can be increased. As such, the driving current $I_{DRV}$ flowing through the PMOS transistor 214 can be increased.

Consequently, the driving current $I_{DRV}$ can be controlled within the certain range. As such, the trickle charging current $I_{TRI}$ flowing through the charging switch 202 can be limited within a predetermined trickle charging current range. Therefore, the voltage of the battery pack 210 can be increased slowly during the trickle charging.

If the voltage of the battery pack 210 is equal to or greater than the predetermined threshold voltage $V_{THS}$, the gate voltage of the PMOS transistor 214 can reach the source voltage of the PMOS transistor 214. Thus, the source-gate voltage of the PMOS transistor 214 can be less than the source-gate threshold voltage of the PMOS transistor 214. The PMOS transistor 214 can be turned off. Hence, the trickle charging driving circuit 220 can be turned off. Meanwhile, the control switch 232 can turn on the normal charging driving circuit 230. Thus, the battery pack 210 can be charged in the normal charging mode rather than the trickle charging mode.

Figure 1:
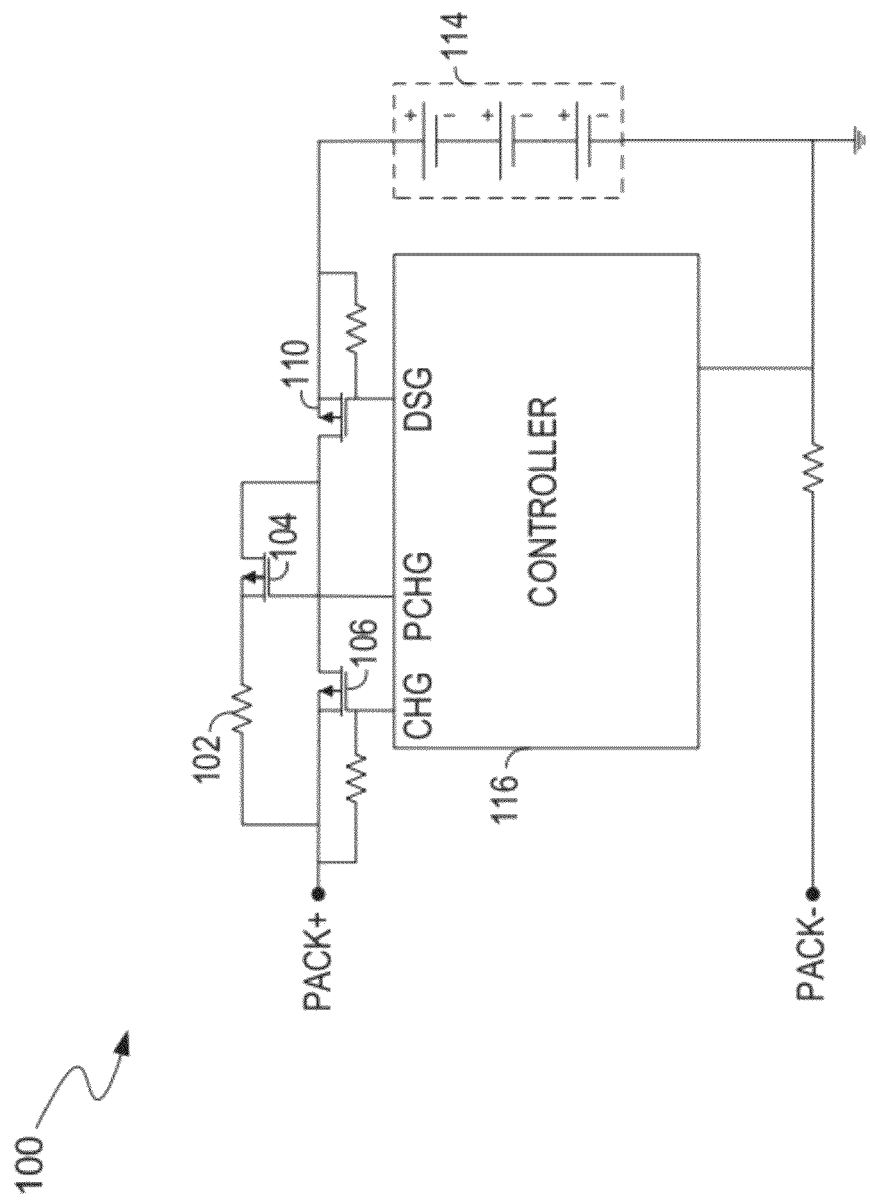
FIG. 1 shows a conventional battery charging system for controlling trickle charging of an over-drained battery pack.

Advantageously, compared with the conventional battery charging system 100 in FIG. 1, the battery charging system 200 can configure the trickle charging driving circuit 220 and the normal charging driving circuit 230 to share one charging switch 202 via one charging control pin CHG. The charging switch 202 can be selectively controlled by the trickle charging driving circuit 220 and the normal charging driving circuit 230 to conduct the trickle charging current and the normal charging current to the battery pack 210 respectively. As a result, an extra charging switch, e.g., the trickle charging FET 104 in FIG. 1, and an extra charging control pin, e.g., the trickle charging control pin PCHG in FIG. 1, can be eliminated. Furthermore, when the voltage of the battery pack 210 is close to zero, the trickle charging driving circuit 220 can be still turned on to generate the driving current $I_{DRV}$ for driving the charging switch 202 in an active mode to charge the battery pack 210. Consequently, the battery charging system 200 can have the advantages of lower cost and improved reliability.

Figure 3:
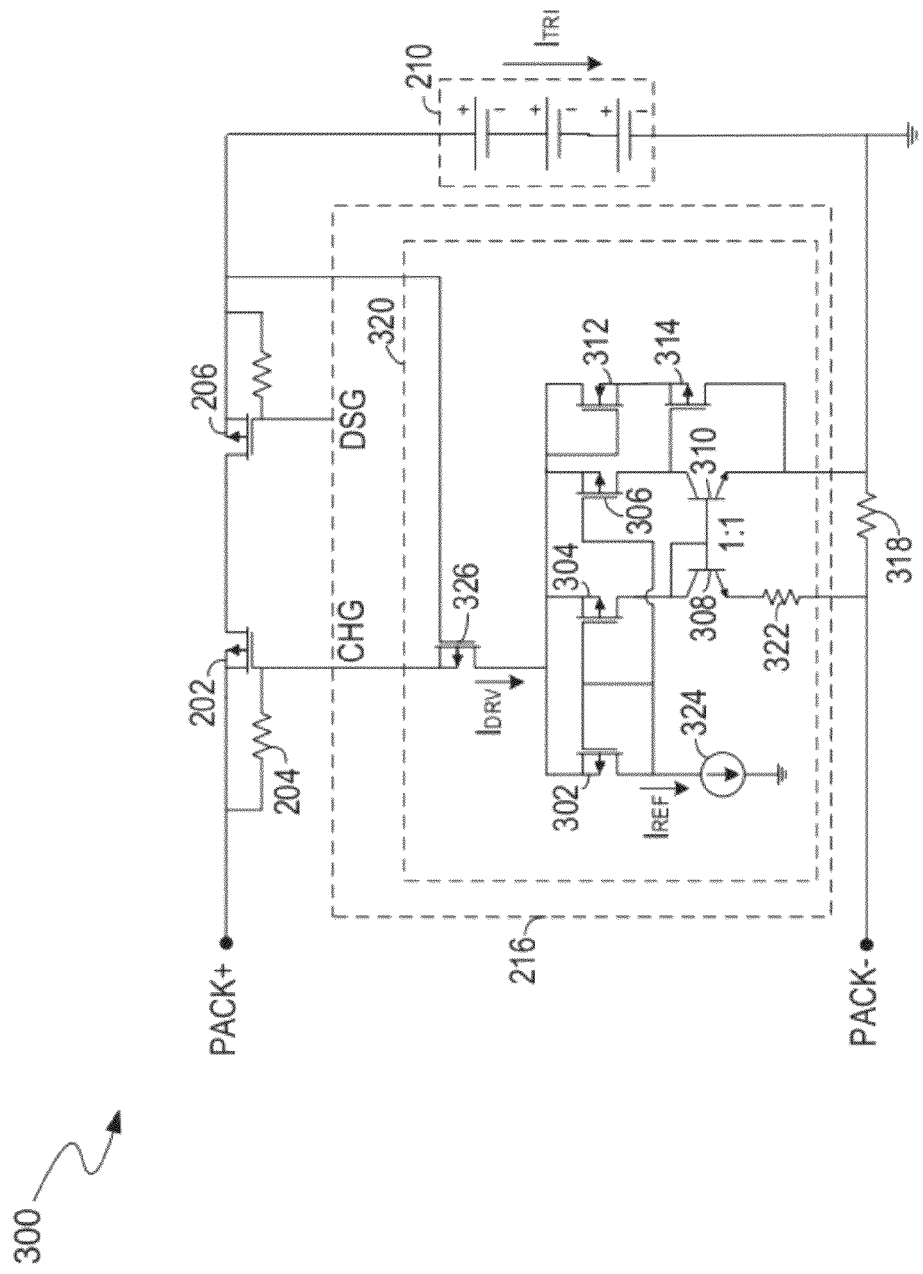
FIG. 3 is a block diagram example of a battery charging system for controlling trickle charging of a battery pack, in accordance with one embodiment of the present invention.

FIG. 3 is a block diagram example of a battery charging system 300 for controlling trickle charging of a battery pack, e.g., the battery pack 210, in accordance with one embodiment of the present invention. Elements that are labeled the same as in FIG. 2 have similar functions. The normal charging driving circuit 230, the control switch 232 and the discharging driving circuit 240 are not shown in FIG. 3 for purposes of clarity and brevity.

In a trickle charging driving circuit 320, a driving transistor 326, e.g., a PMOS transistor, coupled to the charging control pin CHG can conduct the driving current $I_{DRV}$ to control the charging switch 202 if the voltage of the battery pack 210 is less than a predetermined threshold $V_{THS}$.

Furthermore, transistors 302, 304 and 306, e.g., PMOS transistors, with their gate terminals and source terminals connected together can form two current mirrors. The current mirrors are coupled to the PMOS transistor 326. The PMOS transistors 302, 304 and 306 are matched or identical, in one embodiment. Therefore, gate-source voltages of the PMOS transistors 302, 304 and 306 can be substantially the same. In addition, the gate terminal and a drain terminal of the PMOS transistor 302 are connected together. Consequently, currents flowing through the PMOS transistors 304 and 306 are substantially equal to a reference current $I_{REF}$. The reference current $I_{REF}$ can be generated by a reference generator 324, e.g., a current source.

The trickle charging driving circuit 320 further includes two matched transistors 308 and 310, e.g., N-P-N type (NPN) transistors, with their collector terminals coupled to drain terminals of the PMOS transistor 304 and 306 respectively, in one embodiment. A base terminal and the collector terminal of the NPN transistor 308 are connected together. A resistor 322 is coupled between an emitter terminal of the NPN transistor 308 and the terminal PACK−. A resistor 318 is connected between an emitter terminal of the NPN transistor 310 and the terminal PACK−. Furthermore, a transistor 314, e.g., a PMOS transistor, is coupled to the NPN transistor 310 to adjust the driving current $I_{DRV}$. A transistor 312, e.g., an N-channel Metal Oxide Semiconductor Field Effect Transistor (NMOS transistor), with its gate and drain terminals connected to the PMOS transistor 326 is coupled to the PMOS transistor 314 to provide a proper operating voltage to the PMOS transistor 314.

When a charger is plugged between terminals PACK+ and PACK−, if the voltage of the battery pack 210 is less than a predetermined threshold voltage $V_{THS}$, a source-gate voltage of the PMOS transistor 326 can be greater than a source-gate threshold voltage of the PMOS transistor 326. As such, the PMOS transistor 326 can be turned on. Consequently, the charging switch 202 can be controlled by the trickle charging driving circuit 320 to conduct a trickle charging current $I_{TRI}$ to charge the battery pack 210. Meanwhile, the control switch 232 (not shown in FIG. 3) can turn off the normal charging driving circuit 230 (not shown in FIG. 3) to disable a normal charging mode.

In the example of FIG. 3, since the currents respectively flowing through the drain terminals of the PMOS transistors 304 and 306 can be substantially the same as the reference current $I_{REF}$, the driving current $I_{DRV}$ can be substantially equal to three times of the reference current $I_{REF}$ plus a current flowing through the NMOS transistor 312 and the PMOS transistor 314. If the driving current $I_{DRV}$ is limited to be less than a predetermined value $I_{PRE}$, a source-gate voltage $V_{SG}$ of the charging switch 202 can be less than a fully turn-on voltage of the charging switch 202. As such, the charging switch 202 can be driven in an active mode. Therefore, the charging switch 202 can conduct the trickle charging current $I_{TRI}$ to charge the battery pack 210. In order to limit the driving current $I_{DRV}$ to be less than the predetermined value $I_{PRE}$, the reference current $I_{REF}$ can be set less than one third of the predetermined value $I_{PRE}$, in the example of FIG. 3. The reference current $I_{REF}$ can be given by: In the example of FIG. 3, since the currents respectively flowing through the drain terminals of the PMOS transistors 304 and 306 can be substantially the same as the reference current $I_{REF}$, the driving current $I_{DRV}$ can be substantially equal to three times of the reference current $I_{REF}$ plus a current flowing through the NMOS transistor 312 and the PMOS transistor 314. If the driving current $I_{DRV}$ is limited to be less than a predetermined value $I_{PRE}$, a source-gate voltage $V_{SG}$ of the charging switch 202 can be less than a fully turn-on voltage of the charging switch 202. As such, the charging switch 202 can be driven in an active mode. Therefore, the charging switch 202 can conduct the trickle charging current $I_{TRI}$ to charge the battery pack 210. In order to limit the driving current $I_{DRV}$ to be less than the predetermined value $I_{PRE}$, the reference current $I_{REF}$ can be set less than one third of the predetermined value $I_{PRE}$, in the example of FIG. 3. The reference current $I_{REF}$ can be given by:

$$\begin{cases} I_{REF} < \frac{1}{3} I_{PRE} \\ I_{PRE} = V_T / R_{204}. \end{cases} \quad (3)$$

$V_T$ represents the source-gate threshold voltage of the charging switch 202. $R_{204}$ represents the resistance of the pull-up resistor 204.

During trickle charging, the matched transistors 308 and 310 can force a voltage across the resistor 318 to be substantially equal to a voltage across the resistor 322. A relationship between the voltage across the resistor 318 and the voltage across the resistor 322 can be given by:

$$(I_{REF} + I_{PCHG} + I_{314}) \times R_{318} = I_{REF} \times R_{322}. \quad (4)$$

$I_{314}$ represents a current flowing through the PMOS transistor 314 if a gate current of the PMOS transistor 314 can be ignored. $R_{318}$ represents resistance of the resistor 318. $R_{322}$ represents resistance of the resistor 322.

If the trickle charging current $I_{TRI}$ increases, the current $I_{314}$ flowing through the PMOS transistor 314 can be decreased to keep the voltage across the resistor 318 substantially equal to the voltage across the resistor 322. Accordingly, the driving current $I_{DRV}$ can be decreased, which results in a decrease of the source-gate voltage of the charging switch 202. As a result, the trickle charging current $I_{TRI}$ can be decreased accordingly. If the trickle charging current $I_{TRI}$ decreases, the current $I_{314}$ flowing through the PMOS transistor 314 can be increased to keep the voltage across the resistor 318 substantially equal to the voltage across the resistor 322. Accordingly, the driving current $I_{DRV}$ can be increased and the source-gate voltage of the charging switch 202 can be increased. As a result, the trickle charging current $I_{TRI}$ can be increased accordingly. Advantageously, the trickle charging current $I_{TRI}$ flowing through the charging switch 202 can be controlled within a predetermined trickle charging current range.

When the voltage of the battery pack 210 is substantially equal to or greater than the predetermined threshold voltage $V_{THS}$, the gate voltage of the PMOS transistor 326 can reach the source voltage of the PMOS transistor 326. Thus, the source-gate voltage of the PMOS transistor 326 can be less than the source-gate threshold voltage of the PMOS transistor 326. The PMOS transistor 326 can be turned off. Hence, the trickle charging driving circuit 320 can be disabled. Meanwhile, the control switch 232 can turn on the normal charging driving circuit 230. The normal charging driving circuit 230 can drive the charging switch 202 fully on via the charging control pin CHG to charge the battery pack 210 in a normal charging mode rather than the trickle charging mode.

In addition, when the terminal PACK+ is floating or no charger is plugged in the battery charging system 300, since the voltage of the battery pack 210 is greater than the voltage at the terminal PACK+, the source-gate voltage of the PMOS transistor 326 can be inverted. Thus, the PMOS transistor 326 can be turned off. Hence, the trickle charging driving circuit 320 is disabled.

Advantageously, when the normal charging driving circuit 230 is turned on to charge the battery pack 210, or no charger is plugged in the battery charging system 300, the trickle charging driving circuit 320 can be disabled by turning off the PMOS transistor 326. As such, a leakage current flowing from the battery pack 210 to the trickle charging driving circuit 320 can be cut off to further enhance the performance of the battery charging system 300.

Figure 4:
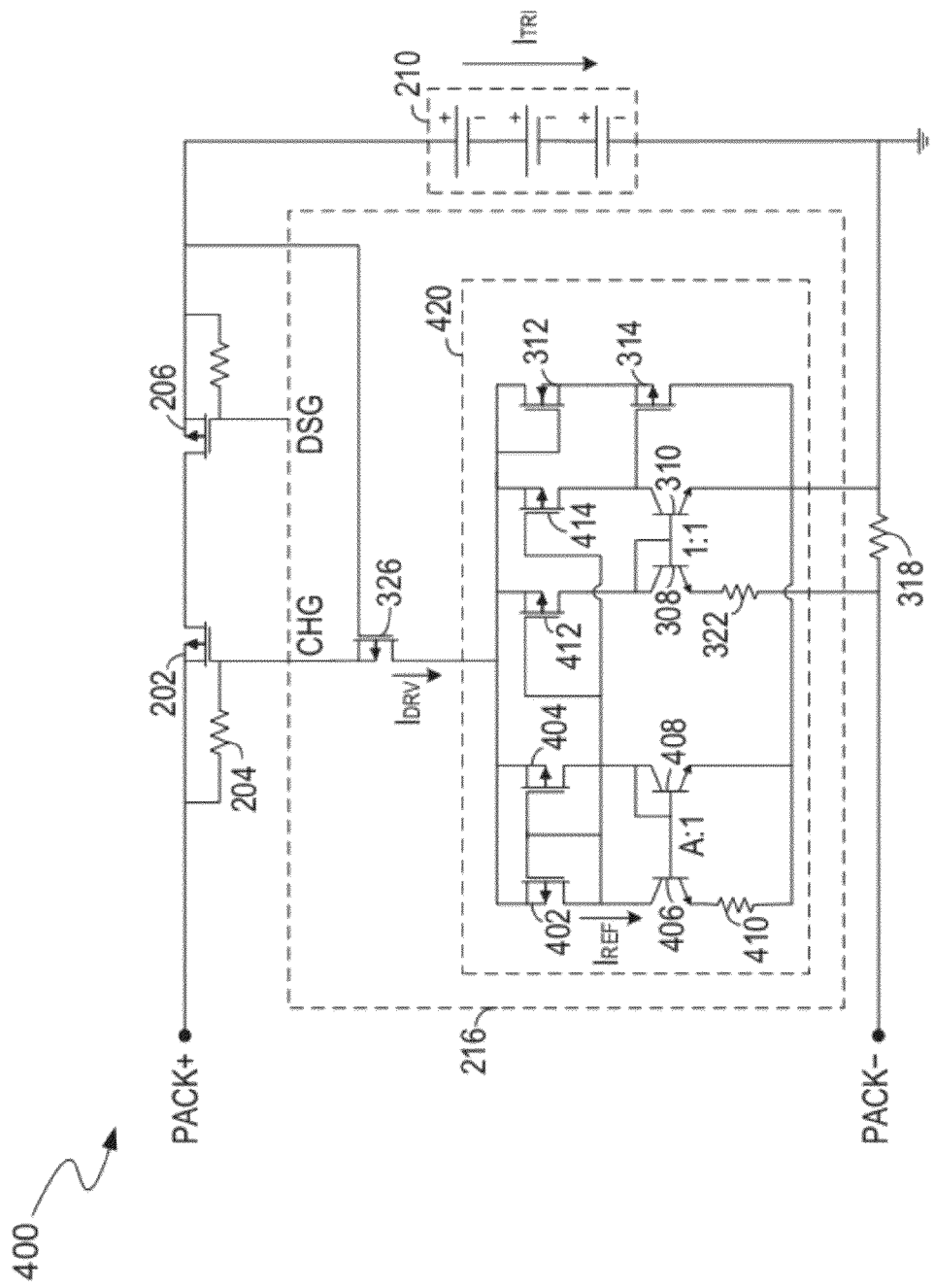
FIG. 4 is a block diagram example of a battery charging system for controlling trickle charging of a battery pack, in accordance with one embodiment of the present invention.

FIG. 4 is a block diagram example of a battery charging system 400 for controlling trickle charging of a battery pack, e.g., the battery pack 210, in accordance with one embodiment of the present invention. Elements that are labeled the same as in FIG. 2 and FIG. 3 have similar functions.

In a trickle charging driving circuit 420, transistors 402, 404, 412 and 414, e.g., PMOS transistors, with their gate terminals and source terminals connected together can form three current mirrors. The current mirrors are coupled to the PMOS transistor 326. The PMOS transistors 402, 404, 412 and 414 are matched or identical, in one embodiment. Therefore, gate-source voltages of the PMOS transistors 402, 404, 412 and 414 can be substantially the same. In addition, the gate terminal and a drain terminal of the PMOS transistor 402 are connected together. Two transistors 406 and 408, e.g., NPN transistors, are coupled to the PMOS transistors 402 and 404 respectively. A base terminal and a collector terminal of the NPN transistor 408 are connected together. A resistor 410 is coupled between the NPN transistor 406 and ground.

In the trickle charging driving circuit 420, the reference current $I_{REF}$ can be generated by a bias circuit including the NPN transistor 406, the NPN transistor 408, and the resistor 410. The reference current $I_{REF}$ can be given according to:

$$\begin{cases} I_{REF} = V_t \times \ln(A) / R_{410} \\ V_t = kT/q. \end{cases} \quad (4)$$

k represents the Boltzmann constant (k=1.38×10$^{-23}$ Joules/K). T represents an absolute temperature of the NPN transistors 406 and 408, e.g., T=290K. q represents an electron charge (q=1.6×10$^{-19}$ C). $V_t$ represents a thermal voltage of the NPN transistors 406 and 408 at the absolute temperature T. $R_{410}$ represents resistance of the resistor 410. A represents an emitter area ratio of the NPN transistor 406 to the NPN transistor 408.

Advantageously, instead of using the constant current source 324 in FIG. 3, the reference current $I_{REF}$ can be self-generated by the bias circuit in the trickle charging driving circuit 420. Thus, the reference current $I_{REF}$ can be controlled by setting the parameter A and the resistance of the resistor 410 with predetermined values.

Figure 5:
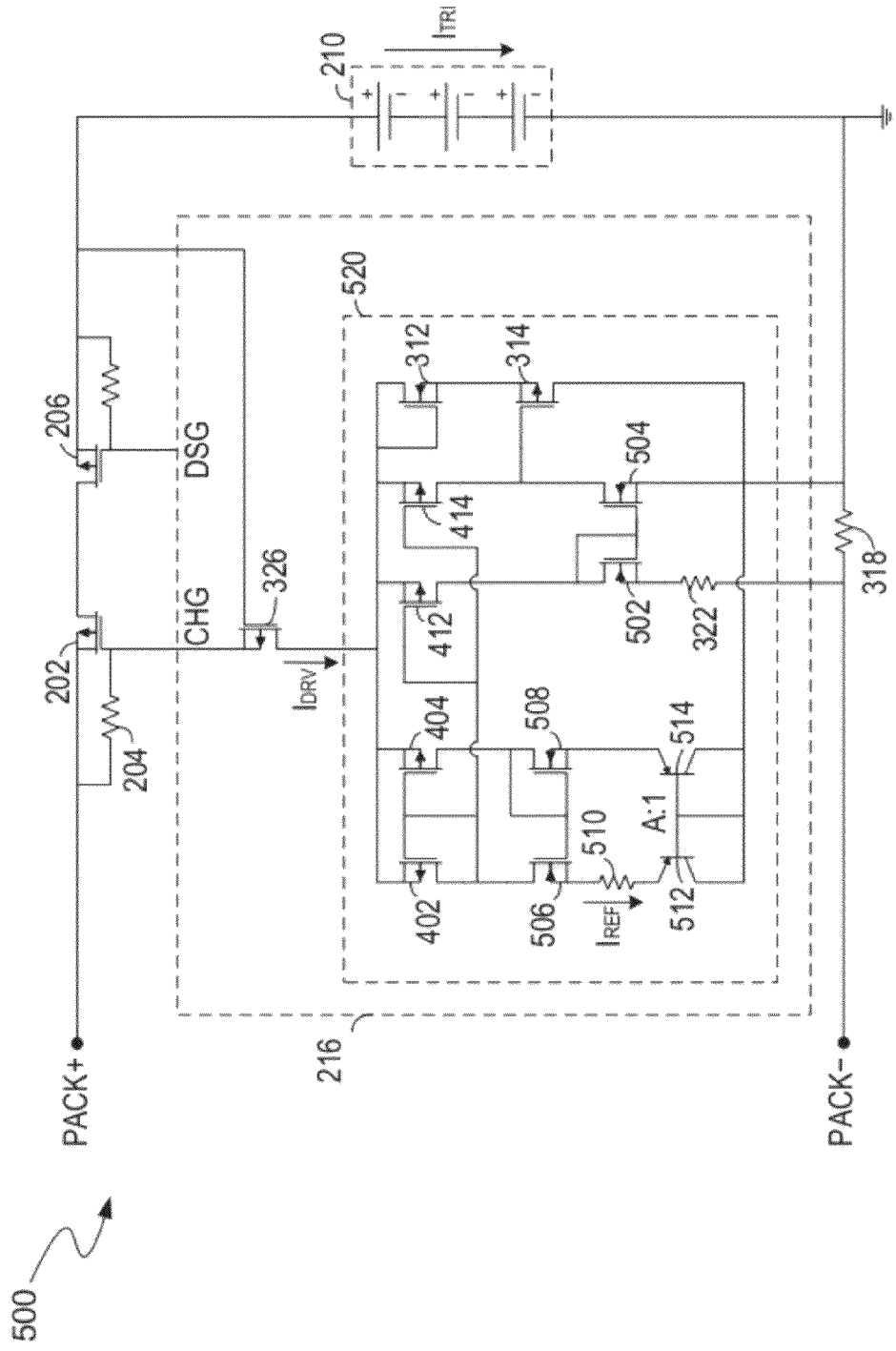
FIG. 5 is a block diagram example of a battery charging system using CMOS technology for controlling trickle charging of a battery pack, in accordance with one embodiment of the present invention.

FIG. 5 is a block diagram example of a battery charging system 500 using CMOS technology for controlling trickle charging of a battery pack, e.g., the battery pack 210, in accordance with one embodiment of the present invention. The cost of an integrated circuit with MOS transistors is relatively low. Elements that are labeled the same as in FIG. 2, FIG. 3 and FIG. 4 have similar functions.

In one embodiment, a pair of matched NMOS transistors 502 and 504 coupled to the transistors 412 and 414 respectively can have similar functions as the pair of the NPN transistors 308 and 310 in the trickle charging driving circuit 420. More specifically, the NMOS transistors 502 and 504 can be used to adjust the driving current $I_{DRV}$ of the charging switch 202 to keep the trickle charging current $I_{TRI}$ within a predetermined trickle charging current range. In addition, the NPN transistors 406 and 408 in the trickle charging driving circuit 420 are replaced with a pair of P-N-P type (PNP) transistors 512 and 514 in the trickle charging driving circuit 520. Base terminals and collector terminals of the PNP transistors 512 and 514 are connected to ground. A resistor 510 is coupled to an emitter terminal of the PNP transistor 512. Furthermore, NMOS transistors 506 and 508 with their base terminals connected together are coupled to the resistor 510 and an emitter terminal of the PNP transistor 514 respectively.

The NMOS transistors 506 and 508 can be matched or identical, in one embodiment. Drain terminals of the NMOS transistors 506 and 508 are coupled to drain terminals of the PMOS transistors 402 and 404 respectively. The base terminal and the drain terminal of the NMOS transistor 508 are connected together.

In one embodiment, the NMOS transistors 506 and 508 are used to force an emitter voltage of the PNP transistor 514 to be substantially equal to a summation of an emitter voltage of the PNP transistor 512 and a voltage across the resistor 510. The reference current $I_{REF}$ can be generated by a bias circuit including the PNP transistor 512, the PNP transistor 514, and the resistor 510. The reference current $I_{REF}$ can be given according to:

$$\begin{cases} I_{REF} = V_t \times \ln(A) / R_{510} \\ V_t = kT/q. \end{cases} \quad (5)$$

k represents the Boltzmann constant (k=1.38×10$^{-23}$ Joules/K). T represents an absolute temperature of the PNP transistors 512 and 514, e.g., T=290K. q represents an electron charge (q=1.6×10$^{-19}$ C). $V_t$ represents a thermal voltage of the PNP transistors 512 and 514 at the absolute temperature T. $R_{510}$ represents resistance of the resistor 510. A represents an emitter area ratio of the PNP transistors 512 to the PNP transistors 514.

Figure 6:
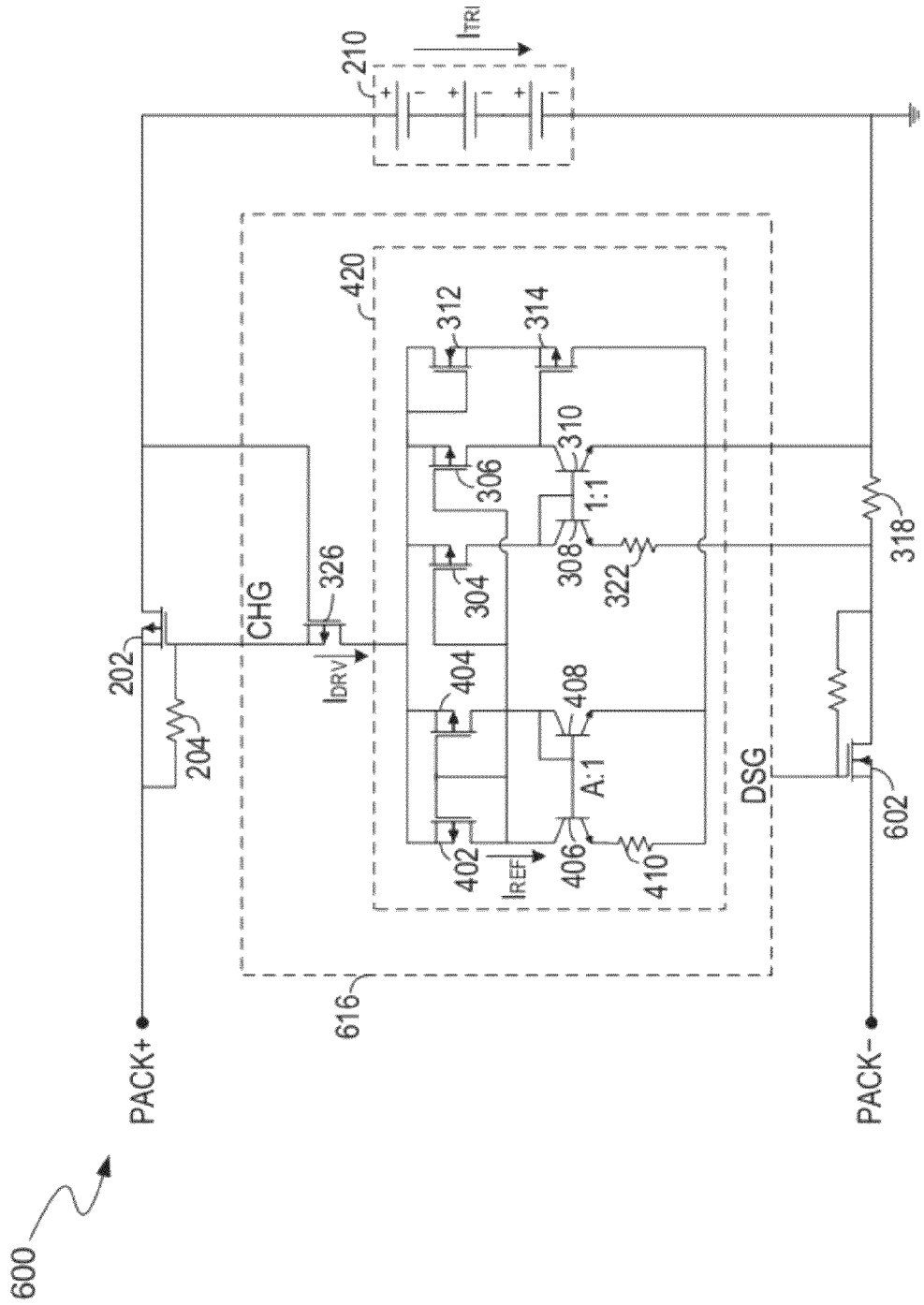
FIG. 6 is a block diagram example of a battery charging system for controlling trickle charging of a battery pack, in accordance with one embodiment of the present invention.

FIG. 6 is a block diagram example of a battery charging system 600 for controlling trickle charging of a battery pack, e.g., the battery pack 210, in accordance with one embodiment of the present invention. Elements that are labeled the same as in FIG. 2, FIG. 3 and FIG. 4 have similar functions.

In one embodiment, an NMOS transistor 602 coupled between the terminal PACK− and the resistor 318 is used as a discharging switch. A gate terminal of the NMOS transistor 602 is connected to the discharging control pin DSG in a controller 616. Advantageously, by locating the discharging switch 602 at the low side of the battery pack 210, the effect of the discharging switch 602 on the trickle charging current $I_{TRI}$ is reduced, in one embodiment.

In the example of FIG. 6, the trickle charging driving circuit 420 shown in FIG. 4 is used in the controller 616 for illustrative purposes. However, any trickle charging driving circuits described in the present disclosure, e.g., the trickle charging driving circuit 220, 320, 420 or 520, can also be used in the controller 616.

Figure 7:
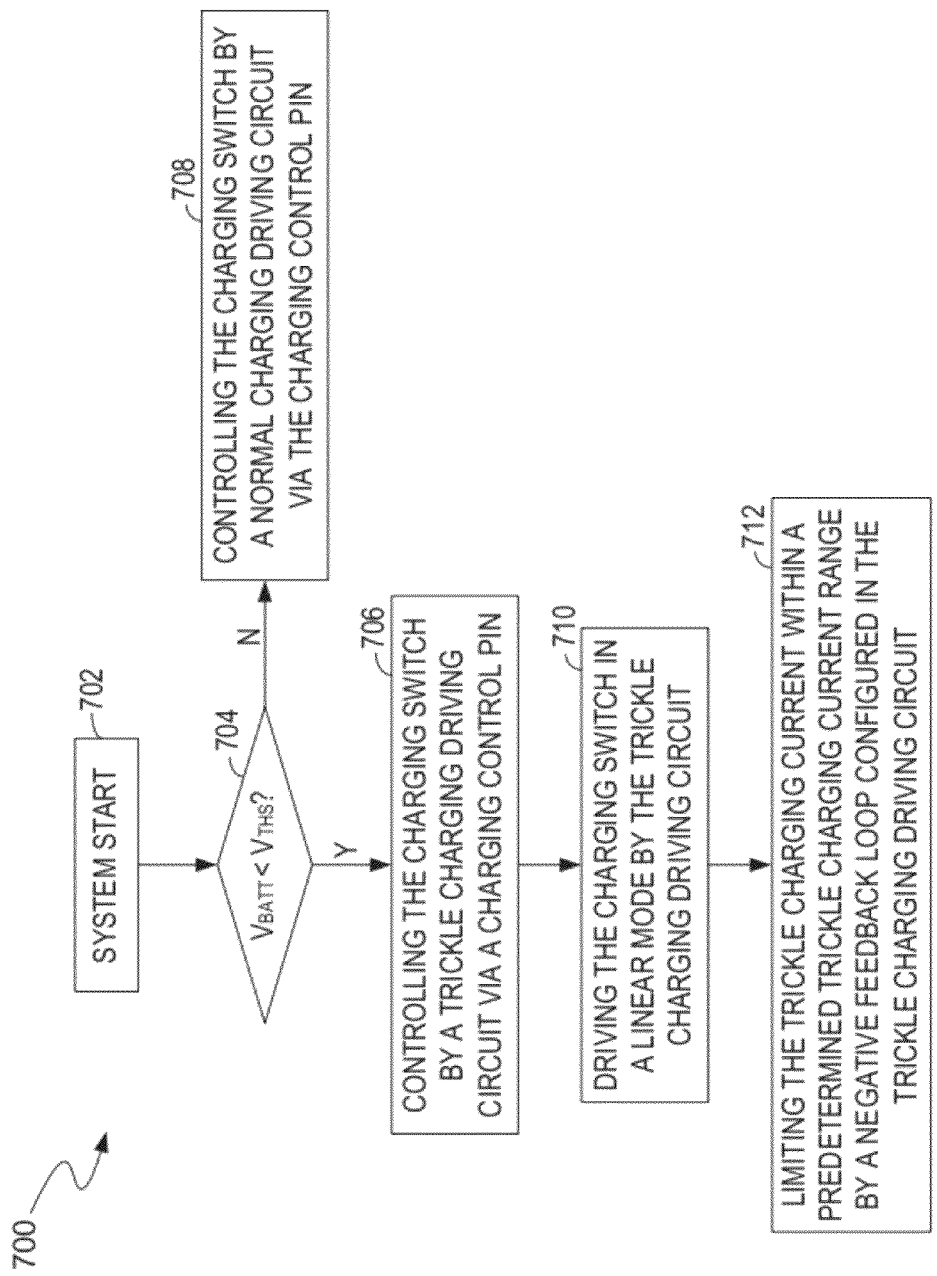
FIG. 7 illustrates a flowchart of operations performed by a battery charging system, in accordance with one embodiment of the present invention.

FIG. 7 illustrates a flowchart 700 of operations performed by a battery charging system described in the present disclosure, e.g., the battery charging system 200 in FIG. 2, in accordance with one embodiment of the present invention. FIG. 7 is described in combination with FIG. 2, FIG. 3, FIG. 4 and FIG. 5. Although specific steps are disclosed in FIG. 7, such steps are examples. That is, the present invention is well suited to perform various other steps or variations of the steps recited in FIG. 7.

The battery charging system starts to charge the battery pack 210 in block 702. If the voltage of the battery pack 210 is less than a predetermined threshold voltage $V_{THS}$ in block 704, the trickle charging driving circuit 220, 320, 420 or 520 can be turned on, and the normal charging driving circuit 230 can be turned off. The charging switch 202 can be controlled by the trickle charging driving circuit 220, 320, 420 or 520 via the charging control pin CHG, in block 706. More specifically, the driving transistor 214 or 326 can sense the voltage of the battery pack 210 and is switched on if the voltage of the battery pack 210 is less than a predetermined threshold voltage $V_{THS}$. A trickle charging current can flow through the charging switch 202 to the battery pack 210.

If the voltage of the battery pack 210 is equal to or greater than the predetermined threshold voltage $V_{THS}$ in block 704, the normal charging driving circuit 230 can be turned on, and the trickle charging driving circuit 220, 320, 420 or 520 can be turned off. The charging switch 202 can be fully turned on by the normal charging driving circuit 230 via the charging control pin CHG, in block 708. Thus, a normal charging current can flow through the charging switch 202 to the battery pack 210.

If the trickle charging driving circuit 220, 320, 420 or 520 is turned on in block 706, the charging switch 202 can be driven in an active mode by the trickle charging driving circuit 220, 320, 420 or 520 in block 710. The charging switch 202 is maintained in the active mode according to the driving current flowing through the driving transistor 214 or 326. A trickle charging current $I_{TRI}$ flowing through the charging switch 202 is used to charge the battery pack 210. The driving current through the driving transistor 214 or 326 is maintained within a first predetermined range to control the trickle charging current $I_{TRI}$ within a second predetermined range. In block 712, a driving current of the charging switch 202 can be adjusted by a negative feedback loop in the trickle charging driving circuit 220, 320, 420 or 520. Accordingly, the trickle charging current $I_{TRI}$ can be limited within a predetermined trickle charging current range. During operation, if the trickle charging current flowing through the charging switch 202 is greater than a predetermined value, the negative feedback loop can automatically decrease the driving current of the charging switch 202 to decrease the trickle charging current $I_{TRI}$. On the contrary, if the trickle charging current flowing through the charging switch 202 is less than the predetermined value, the negative feedback loop can increase the driving current of the charging switch 202 to increase the trickle charging current $I_{TRI}$. As such, the trickle charging current $I_{TRI}$ can be limited within the predetermined trickle charging current range. Therefore, the voltage of the battery pack 210 can be increased slowly during trickle charging.

Accordingly, the normal charging driving circuit 230 and the trickle charging driving circuit 220, 320, 420 or 520 can share one charging switch 202 via one charging control pin CHG in the battery charging systems described in the present disclosure. As such, the charging switch 202 coupled to the charging control pin can control both trickle charging and normal charging functions of the battery pack. If the voltage of the battery pack 210 is less than a predetermined threshold $V_{THS}$, the trickle charging driving circuit 220, 320, 420 or 520 can be turned on to drive the charging switch 202 in an active mode to control trickle charging of the battery pack 210. Meanwhile, the normal charging driving circuit 230 can be turned off. If the voltage of the battery pack 210 is equal to or greater than the predetermined threshold $V_{THS}$, the normal charging driving circuit 230 can be turned on to drive the charging switch 202 fully on to control normal charging of the battery pack 210. Meanwhile, the trickle charging circuit 220, 320, 420 or 520 can be turned off. Furthermore, the battery charging systems described in the present disclosure can be also used for controlling trickle charging of multiple battery packs.

In the trickle charging driving circuit 220, 320, 420 or 520, a negative feedback loop can be configured to adjust a driving current $I_{DRV}$ of the charging switch 202 to limit the trickle charging current within a predetermined trickle charging current range. If the trickle charging current flowing through the charging switch 202 increases, the negative feedback loop can decrease a driving current $I_{DRV}$ of the charging switch 202 to decrease the trickle charging current. If the trickle charging current flowing through the charging switch 202 decreases, the negative feedback loop can increase the driving current $I_{DRV}$ of the charging switch 202 to increase the trickle charging current.

Advantageously, an extra charging switch, e.g., the charging FET 104 in FIG. 1, and an extra trickle charging control pin, e.g., the trickle charging control pin PCHG in FIG. 1, are not needed in the battery charging systems described in the present disclosure. Furthermore, the trickle charging driving circuit 220, 320, 420 or 520 can be independent from the voltage of the battery pack 210 and directly powered by a charger. Advantageously, the trickle charging driving circuit 220, 320, 420 or 520 can be still turned on to charge the battery pack 210 even if the voltage of the battery pack 210 is close to zero. Consequently, the battery charging systems described in the embodiments of the present disclosure can have advantages of lower cost and better reliability. By similar rational, a trickle discharging driving circuit and a normal discharging driving circuit can be implemented in the battery system to enable trickle discharging and normal discharging.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A circuit comprising:
   a switch coupled to a battery; and
   a driving transistor coupled to said switch and operable for sensing a voltage of said battery, wherein said driving transistor is turned on if said voltage of said battery is less than a predetermined threshold, and wherein a driving current flowing through said driving transistor is within a first predetermined range to control a current flowing through said switch within a second predetermined range.

2. The circuit of claim 1, wherein a gate terminal of said driving transistor senses said voltage of said battery.

3. The circuit of claim 1, further comprising:
   a resistor coupled to said switch, wherein said driving current flows through said driving transistor and said resistor, and wherein a voltage across said resistor determines said current flowing through said switch.

4. The circuit of claim 1, further comprising:
   a normal charging driving circuit coupled to said switch and operable for controlling a normal charging current flowing through said switch to said battery if said voltage of said battery is greater than said predetermined threshold.

5. The circuit of claim 4, further comprising:
   a control switch coupled to said normal charging driving circuit and operable for disabling said normal charging driving circuit if said voltage of said battery is less than said predetermined threshold, wherein said driving transistor is turned on to control a trickle charging current flowing through said switch to said battery if said voltage of said battery is less than said predetermined threshold, and wherein said trickle charging current is less than said normal charging current.

6. The circuit of claim 1, further comprising:
a discharging driving circuit coupled to said switch and operable for controlling a discharging current flowing from said battery through said switch.

7. The circuit of claim 1, wherein said switch is fully on if said voltage of said battery is greater than said predetermined threshold.

8. The circuit of claim 1, further comprising:
a resistor coupled to said battery and operable for receiving a current flowing through said battery; and
a transistor coupled to said resistor and operable for sensing a voltage of said resistor and for adjusting said driving current according to said voltage of said resistor.

9. A method for controlling a battery, comprising:
sensing a voltage of said battery by a driving transistor;
turning on said driving transistor if said voltage of said battery is less than a predetermined threshold; and
maintaining a switch coupled to said battery in series in a linear mode according to a driving current flowing through said driving transistor;
controlling a driving current flowing through said driving transistor within a first predetermined range to control a current flowing through a switch within a second predetermined range, wherein said switch is coupled to said battery.

10. The method of claim 9, further comprising:
enabling said driving current to flow through a resistor coupled to said switch; and
controlling a voltage across said resistor to control said current flowing through said switch.

11. The method of claim 9, further comprising:
conducting a normal charging current flowing through said switch to said battery if said voltage of said battery is greater than said predetermined threshold; and
disabling said normal charging current if said voltage of said battery is less than said predetermined threshold.

12. The method of claim 9, further comprising:
fully turning on said switch if said voltage of said battery is greater than said predetermined threshold.

13. The method of claim 9, further comprising:
conducting a current flowing through said battery to a resistor coupled to said battery; and
adjusting said driving current according to a voltage of said resistor.

14. A battery system comprising: a charging switch coupled to a battery in series; and a trickle charging driving circuit coupled to said charging switch and operable for controlling a trickle charging current of said battery through said charging switch, said trickle charging driving circuit comprising a driving transistor operable for sensing a voltage of said battery, wherein said driving transistor turns on said trickle charging driving circuit if said voltage of said battery is less than a predetermined threshold, and wherein a driving current flowing through said driving transistor is within a first predetermined range to control said trickle charging current within a second predetermined range.

15. The battery system of claim 14, wherein a gate terminal of said driving transistor senses said voltage of said battery.

16. The battery system of claim 14, further comprising:
a resistor coupled to said charging switch, wherein said driving current flows through said driving transistor and said resistor, and wherein a voltage across said resistor determines said trickle charging current.

17. The battery system of claim 14, further comprising:
a normal charging driving circuit coupled to said charging switch and operable for controlling a normal charging current flowing through said charging switch to said battery if said voltage of said battery is greater than said predetermined threshold, wherein said charging switch is selectively controlled by said trickle charging driving circuit and said normal charging driving circuit according to said voltage of said battery.

18. The battery system of claim 17, further comprising:
a control switch coupled to said normal charging driving circuit and operable for disabling said normal charging driving circuit if said voltage of said battery is less than said predetermined threshold.

19. The battery system of claim 14, wherein said charging switch is fully on if said voltage of said battery is greater than said predetermined threshold.

20. The battery system of claim 14, further comprising:
a resistor coupled to said battery and operable for receiving a current flowing through said battery; and
a transistor coupled to said resistor and operable for sensing a voltage of said resistor and for adjusting said driving current according to said voltage of said resistor.

* * * * *